United States Patent
Oh et al.

(10) Patent No.: US 8,503,051 B2
(45) Date of Patent: Aug. 6, 2013

(54) GENERATING A PREVIEW IMAGE BY PROVIDING A COLOR MATCHING FUNCTION AND A COLOR EDITING FUNCTION FOR DIFFERENT OBJECTS CONTAINED IN A DOCUMENT TO BE PRINTED

(71) Applicant: SAMSUNG Electronics Co., Ltd., Suwon-si (JP)

(72) Inventors: Hyun-soo Oh, Suwon-si (KR); Goo-soo Gahang, Yongin-si (KR); Kyeong-man Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/733,294

(22) Filed: Jan. 3, 2013

(65) Prior Publication Data

US 2013/0120777 A1 May 16, 2013

Related U.S. Application Data

(63) Continuation of application No. 11/268,464, filed on Nov. 8, 2005, now abandoned.

(30) Foreign Application Priority Data

Nov. 11, 2004 (KR) ........................ 10-2004-0091969

(51) Int. Cl.
*G03F 3/08* (2006.01)

(52) U.S. Cl.
USPC ............ 358/518; 345/593; 345/604; 358/1.9; 358/2.1; 382/167

(58) Field of Classification Search
USPC ...... 345/593, 604; 358/1.9, 2.1, 518; 382/167
See application file for complete search history.

(56) References Cited

U.S. PATENT DOCUMENTS

2004/0075853 A1   4/2004   Kriss

FOREIGN PATENT DOCUMENTS

| KR | 1998-87408 | 12/1998 |
| KR | 10-2004-0003225 | 1/2004 |

OTHER PUBLICATIONS

Korean Office Action dated Mar. 31, 2006 issued in KR 2004-91969.

*Primary Examiner* — Eric A Rust
(74) *Attorney, Agent, or Firm* — Stanzione & Kim, LLP

(57) ABSTRACT

A method and apparatus to generate a preview image. The method of generating the preview image includes classifying data input from an application program by data types, performing a color matching operation that converts a first color signal of the input data into a second color signal used in a printing device according to one or more rendering intents set for the classified data types, and generating the preview image of the input data for which the color matching operation is completed. The preview image is generated based on the color-matched data for the different classified data types. Thus, the preview image appears to be substantially the same image as a document that is printed by an image forming device.

14 Claims, 6 Drawing Sheets

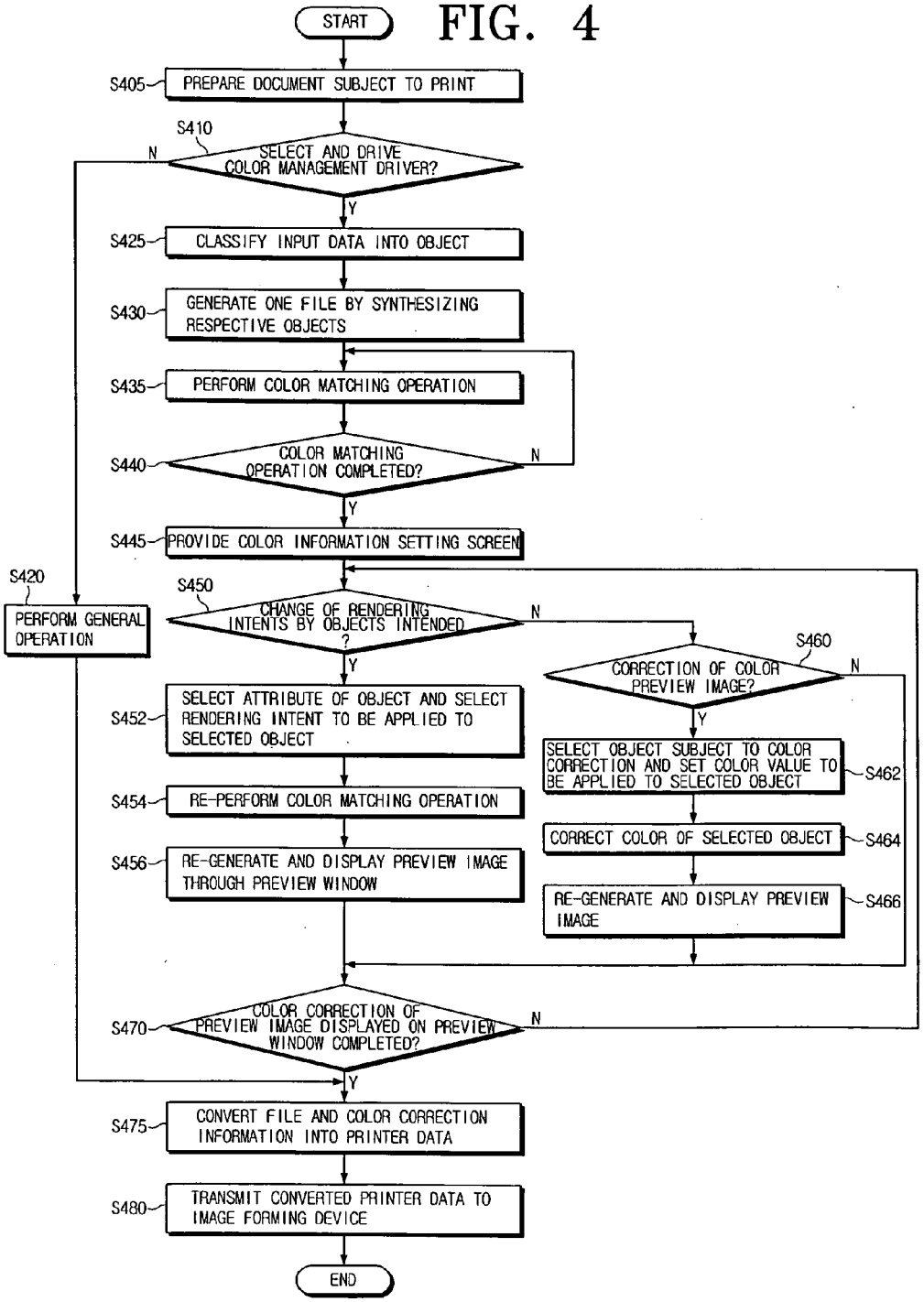

FIG. 5A
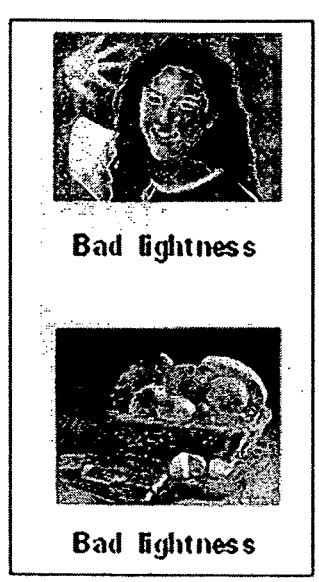
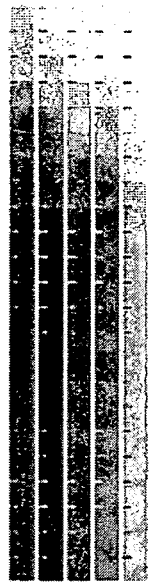
Bad lightness
Bad lightness
Red
Green
Blue
Cyan
Bad purity
Magenta
Yellow
Black
Image Object    Graphic Object    Text Object

GENERATING A PREVIEW IMAGE BY PROVIDING A COLOR MATCHING FUNCTION AND A COLOR EDITING FUNCTION FOR DIFFERENT OBJECTS CONTAINED IN A DOCUMENT TO BE PRINTED

CROSS-REFERENCE TO RELATED APPLICATIONS

This application is a Continuation Application of prior application Ser. No. 11/268,464, filed on Nov. 8, 2005 in the United States Patent and Trademark Office, which claims the benefit under 35 U.S.C. §119 from Korean Patent Application No. 2004-91969 filed on Nov. 11, 2004 in the Korean Intellectual Property Office, the entire content of which is incorporated herein by reference.

BACKGROUND OF THE INVENTION

1. Field of the Invention

The present general inventive concept relates to a method and apparatus to generate a preview image, and more particularly, to a method and apparatus to generate a preview image using a driver program having a soft-proofing function.

2. Description of the Related Art

In general, since a display monitor and a printer have color presenting modes that are different from each other, an image displayed on the display monitor may appear different from an image printed by the printer. For example, the display monitor presents colors in an RGB color mode while the printer presents colors in a CMYK color mode. Accordingly, when printing the image displayed on the display monitor using an output device, such as the printer, a color matching operation is required for converting an RGB color signal input from the display monitor to a CMYK color signal to be used in the printer.

Typically, a separate application program for supporting a soft-proofing function such as 'Photoshop' of Adobe Systems Inc., 'Photo-paint' of Corel Corporation, etc., is typically used to confirm the color of an image to be printed, before printing the image displayed on the display monitor. The soft-proofing function converts the RGB color signal of the display monitor to the CMYK color signal of the printer using a monitor profile and a printer profile, and enables a user to confirm a result of the conversion using the display monitor before submitting a print command to perform a printing operation.

When using the application program, the color of printed objects can be estimated through a preview screen before the image that is displayed on the display monitor is printed by the printer.

However, since a color matching operation performed by the application program is different from the color matching operation performed by the printer, it is difficult to accurately estimate a result of the printing. For example, the application program that provides the soft-proofing function performs the color matching operation by setting rendering intents irrespective of types of objects (e.g., text, graphics, image, etc.) contained in a document to be printed. By contrast, the printer performs the color matching operation by setting the rendering intents to match characteristics of respective objects contained in the document to be printed. Accordingly, although the application program that provides the soft-proofing function is used, it is difficult to accurately estimate the result of the printing with respect to a document having several different types of objects mixed therein.

SUMMARY OF THE INVENTION

The present general inventive concept provides a method and apparatus to generate a preview image that appears to be substantially the same as a printed image that is printed by an image forming device using a driver program that provides a color matching function and a color editing function for different objects contained in a document to be printed.

Additional aspects of the present general inventive concept will be set forth in part in the description which follows and, in part, will be obvious from the description, or may be learned by practice of the general inventive concept.

The foregoing and/or other aspects may be achieved by providing a method of generating a preview image, the method comprising: classifying data input from an application program by data types, performing a color matching operation that converts a first color signal of the input data into a second color signal used in a printing device according to one or more rendering intents set for the classified data types, and generating the preview image of the data for which the color matching operation is completed.

The method may further include generating a file by synthesizing the classified input data before the color matching operation is performed.

The method may further include generating and providing a user interface in which the preview image is displayed.

The color matching operation may be performed using an input device ICC (International Color Consortium) profile and an output device ICC profile having a lookup table provided to correspond to the one or more rendering intents thereof.

The user interface may include a rendering intent setting window through which the one or more rendering intents are changeable for the input data that is classified by the data types.

The color matching operation may be re-performed for data having one or more changed rendering intents if the one or more rendering intents are changed in the rendering intent setting window.

The method may further include selecting an area in the preview image where color is to be corrected, inputting a color value to be applied to the selected area, and correcting the color of the selected area based on the input color value.

The method may further include selecting one color in the selected area, and correcting the selected color in the selected area in the preview image.

The foregoing and/or other aspects of the present general inventive concept may also be achieved by providing a method of previewing an image usable with an image forming apparatus, the method comprising setting a plurality of rendering intents associated with a plurality of different data object types, and generating a preview image of a specified file according to the set plurality of rendering intents.

The foregoing and/or other aspects of the present general inventive concept may also be achieved by providing an apparatus to generate a preview image, comprising a classifying unit to classify data input from an application program by data types, a color matching unit to perform a color matching operation that converts a first color signal of the input data into a second color signal used in a printing device according to one or more rendering intents set for the classified data types, and a screen generating unit to generate and provide a user interface to display the preview image of the data for which the color matching operation is completed.

The apparatus may further include a file generating unit to generate a file by synthesizing the input data according to the classified data types.

The color matching unit may perform the color matching operation using an input device ICC profile and an output device ICC profile having a lookup table provided to correspond to the one or more rendering intents.

The user interface may include a rendering intent setting window through which the one or more rendering intents are changeable for the input data that is classified by the data types.

The color matching unit may re-perform the color matching operation for the data having the changed one or more rendering intents if the one or more rendering intents are changed through the rendering intent setting window.

The apparatus may further include a color correcting unit to correct a color of an area selected in the preview image.

The foregoing and/or other aspects of the present general inventive concept may also be achieved by providing an image preview apparatus usable with an image forming apparatus, the image preview apparatus comprising a color management driver to set a plurality of rendering intents associated with a plurality of different data object types, and a display unit to generate a preview image of a specified file according to the set plurality of rendering intents.

The foregoing and/or other aspects of the present general inventive concept may also be achieved by providing an image forming apparatus, comprising a color management driver to set a plurality of rendering intents associated with a plurality of different data object types and to generate a preview image of a specified file according to the set plurality of rendering intents.

The foregoing and/or other aspects of the present general inventive concept may also be achieved by providing a computer-readable medium containing executable code to generate a preview image, the medium comprising: a first executable code to classify data input from an application program by data types, a second executable code to perform a color matching operation that converts a first color signal of the input data into a second color signal used in a printing device according to one or more rendering intents set for the classified data types, and a third executable code to generate and provide the preview image of the data for which the color matching operation is completed.

The computer-readable medium may further comprise a fourth executable code to select an area in the preview image for which color is to be corrected, a fifth executable code to input a color value to be applied to the color of the selected area, and a sixth executable code to correct the color of the selected area based on the input color value.

The foregoing and/or other aspects of the present general inventive concept may also be achieved by providing a user interface usable with an image forming apparatus to preview an image on a display unit before printing. The user interface comprises a preview window to display a preview image of a file containing one or more data objects, and a rendering intent setting window to enable a user to set one or more rendering intents for each different type of data object.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 4 is a flowchart illustrating a method of generating a preview image according to an embodiment of the present general inventive concept; and FIGS. 5A and 5B are views illustrating an example of an image corrected using a color correcting function according to an embodiment of the present general inventive concept.

DETAILED DESCRIPTION OF THE PREFERRED EMBODIMENTS

Figure 1:
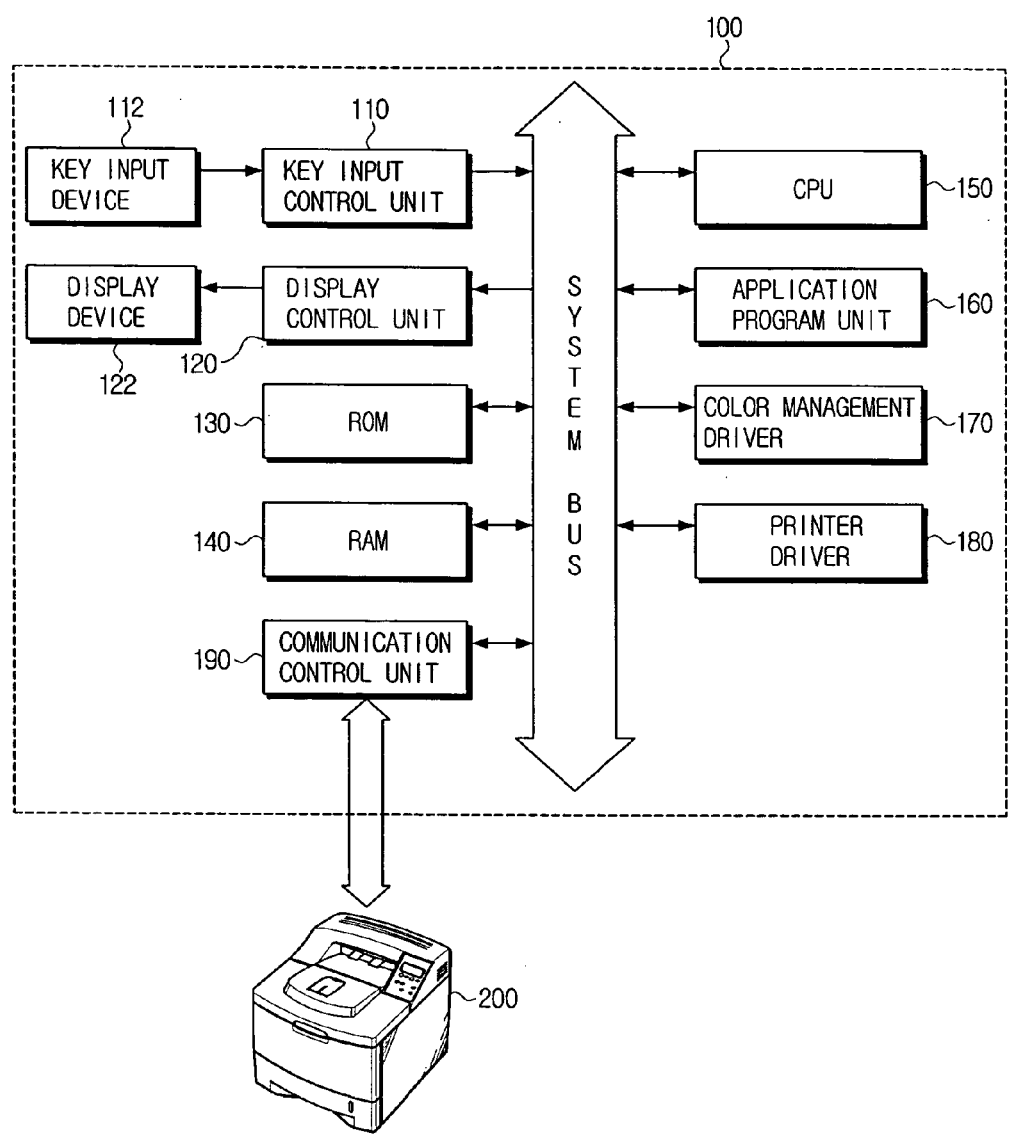
FIG. 1 is a block diagram schematically illustrating a host device having an apparatus to generate a preview image according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram schematically illustrating a host device 100 having an apparatus to generate a preview image according to an embodiment of the present general inventive concept.

Referring to FIG. 1, the host device 100 generates and transmits a document (or file) to be printed to an image forming device 200, which is an output device. The image forming device 200 performs a printing operation to print the document. The host device 100 can access the image forming device 200 not only through a universal serial bus (USB) port, but also through a Local Area Network (LAN) or the Internet.

The host device 100 includes a key input control unit 110, a display control unit 120, a read only memory (ROM) 130, a random access memory (RAM) 140, a Central Processing Unit (CPU) 150, an application program unit 160, a color management driver 170, a printer driver 180, and a communication control unit 190.

The key input control unit 110 communicates with a key input device 112, and provides key input signals input at the key input device 112 to the CPU 150. The key input device 112 includes a plurality of function keys that can set or select functions supported by the host device 100. The key input device 112 may be implemented by a keyboard, a mouse, etc.

The display control unit 120 provides various kinds of display information received from the CPU 150 to the display device 122. The display device 122 displays the various kinds of display information provided by the display control unit 120. The display device 122 may be a monitor implemented by a Cathode Ray Tube (CRT), a Liquid Crystal Display (LCD), etc.

The ROM 130 stores various kinds of control programs used to implement the functions supported by the host device 100. That is, the ROM 130 stores an Operating System (OS) that is a control program of the CPU 150.

The RAM 140 temporarily stores various kinds of data produced while the CPU 150 executes application programs and/or the control programs. The RAM 140 may be a main memory of the CPU 150, and the control programs and the application programs to be executed by the CPU 150 may be loaded from the ROM 130, a hard disc drive (HDD), or the application program unit 160 and then stored in the RAM 140.

The CPU 150 controls overall operation of the host device 100 by executing the control programs stored in the ROM 130. The CPU 150 according to the present general inventive concept executes the application programs, which relate to preparation of the document to be printed, the color management driver 170, and the printer driver 180.

The application program unit 160 includes a plurality of application programs that can prepare various kinds of documents and/or files.

The color management driver 170 provides a preview function, a color matching function, and a color correction function for different objects. The preview function confirms an output result of performing the printing operation on a selected document prepared via the application program unit 160, before the selected document is actually printed using the image forming device 200. The color management driver 170 may be a universal driver made by a general Windows Device Development Kit (DDK).

Figure 2:
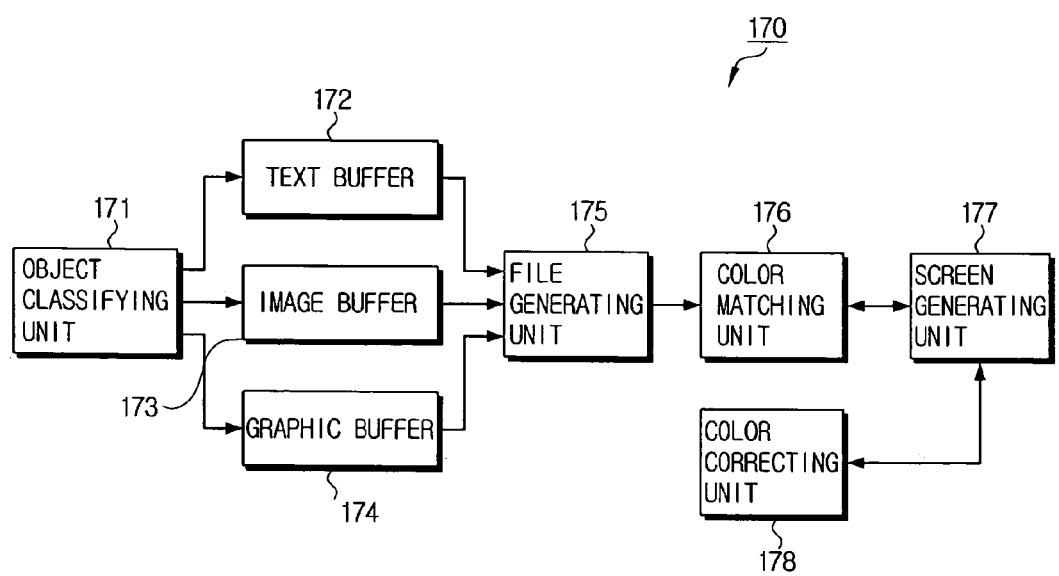
FIG. 2 is a block diagram schematically illustrating a color management driver of the host device of FIG. 1.

FIG. 2 is a block diagram schematically illustrating the color management driver 170 of the host device 100. As illustrated in FIG. 2, the color management driver 170 according to an embodiment the present general inventive concept includes an object classifying unit 171, a file generating unit 175, a color matching unit 176, a screen generating unit 177, and a color correcting unit 178.

The object classifying unit 171 classifies data input from the application program unit 160 according to a print command as including one or more text object(s), one or more image object(s), and/or one or more graphic object(s) and outputs the classified object(s). The text object(s) output from the object classifying unit 171 are temporarily stored in a text buffer 172, the image object(s) are temporarily stored in an image buffer 173, and the graphic object(s) are temporarily stored in a graphic buffer 174. The data may include a single object or a plurality of objects classified as the text objects, image objects, or graphic objects.

The file generating unit 175 synthesizes the respective objects stored in the text buffer 172, the image buffer 173, and the graphic buffer 174 and generates a file of a specified format. The specified format may be a format of which vector and raster can be simultaneously processed. For example, the specified format used by the file generating unit 175 may be an Enhanced Meta File (EMF) of Microsoft Corporation, PostScript and/or Portable Document Format (PDF) of Adobe Systems Inc., etc.

The color matching unit 176 converts an RGB color signal of the file input from the file generating unit 175 into a CMYK color signal of the image forming device 200 using a monitor ICC (International Color Consortium) profile, which corresponds to the display device 122, and a printer ICC profile, which corresponds to the image forming apparatus 200. The monitor ICC profile and the printer ICC profile may include a plurality of lookup tables prepared in advance based on rendering intents that correspond to attributes of the respective types of objects. The color matching unit 176 selects the lookup table that corresponds to the rendering intents set for the respective types of objects from the monitor ICC profile and the printer ICC profile, and performs a color matching operation on the file received from the file generating unit 175.

The screen generating unit 177 displays the preview image of the color-matched file, and generates and provides a color information setting screen to correct the color of the preview image. The color information setting screen corresponds to a user interface (UI) provided by the color management driver 170.

Figure 3:
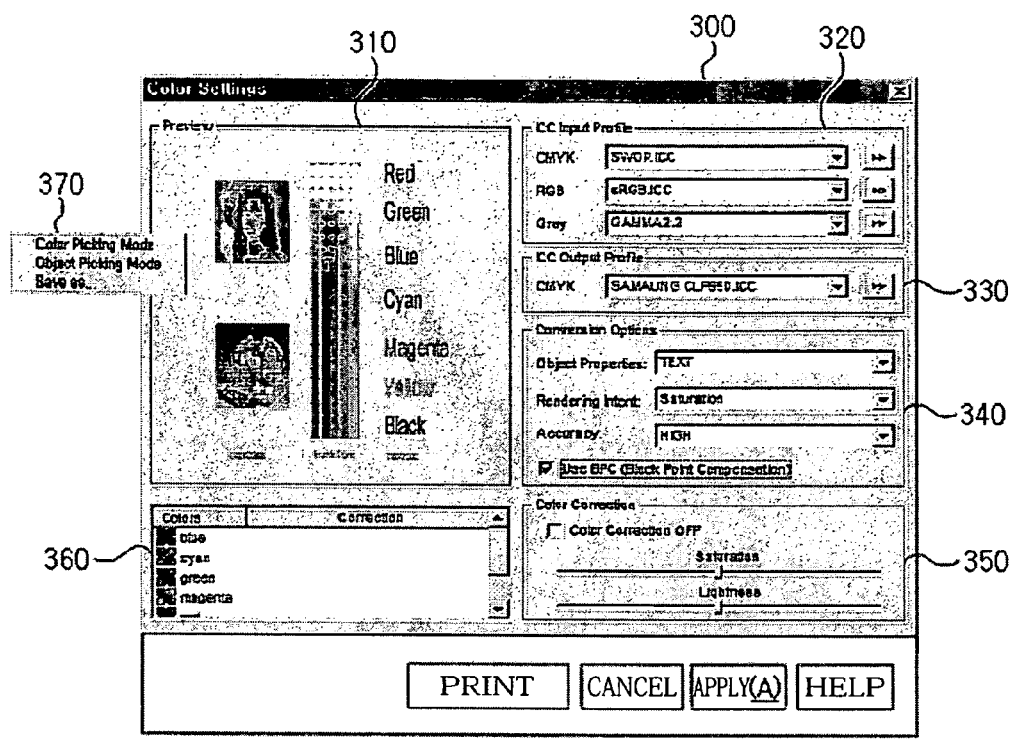
FIG. 3 is a view illustrating an example of a color information setting screen provided by a screen generating unit of the color management driver of FIG. 2.

FIG. 3 is a view illustrating an example of the color information setting screen 300 provided by the screen generating unit 177. As illustrated in FIG. 3, the color information setting screen 300 includes a preview window 310, an input profile setting window 320, an output profile setting window 330, a rendering intent setting window 340, a color information correcting window 350, a corrected information display window 360, and a short cut menu 370. The color information setting screen 300 may also include other elements.

The preview window 310 displays the preview image of the color-matched file provided by the color matching unit 176.

The input profile setting window 320 and the output profile setting window 330 provide interfaces to select an input ICC profile and an output ICC profile used in the color matching operation.

The rendering intent setting window 340 provides an interface through which a user can set the rendering intents for the different types of objects. The rendering intent setting window 340 is provided with a menu item to select a type or of an object, and a menu item to select the rendering intents to be applied to the selected type of object. If the rendering intents of the respective types of objects are changed by the user, the color matching unit 176 re-performs the color matching operation for the file provided by the file generating unit 175, which corresponds to the document to be printed, based on the changed rendering intents. The preview image displayed in the preview window 310 is changed to an image that corresponds to the result of the re-performed color matching. If the rendering intents of the respective types of objects are not changed by the user, the color matching unit 176 may perform the color matching operation according to a default value of the rendering intents, which may be set when the color management driver 170 is installed.

The color information correcting window 350 is a window that provides an interface to enable a user to correct a color of an area selected in the preview image displayed in the preview window 310 to a color desired by the user. The color information correcting window 350 may be provided with a check box to select a color correction off function and/or slide bars to adjust levels of saturation and/or lightness of the color of the selected area in the preview image. If the color correction off function is selected in the color information correcting window 350, the color matching operation is not performed. In this case, the RGB color signal of the file is converted into a CMY color signal (i.e., instead of the CMYK color signal) using Equation (1).

$$C=1-R$$

$$M=1-G$$

$$Y=1-B \qquad (1)$$

When correcting the color of the selected area in the preview image using the color information correcting window 350, the area that includes the color to be corrected is selected. The slide bars can then be manipulated to adjust the saturation level or the lightness level of the color of the selected area of the preview image.

The color correcting unit 178 then corrects an RGB value of the color of the selected area in the preview image based on the saturation level or the lightness level adjusted in the color information correcting window 350.

The corrected information display window 360 is a window to display information about the color corrected in the color information correcting window 350. The information displayed in the corrected information display window 360 is provided to the printer driver 180 according to the print command.

Referring again to FIG. 1, the printer driver 180 converts the document prepared through the application program unit 160 or the file having the color correction performed by the color management driver 170, which corresponds to the document to be printed, into printer data that can be recognized by the image forming device 200. Additionally, the printer driver 180 provides a print option setting screen to set one or more print options, for example, a paper size, a type of paper, a direction of the paper, and a number of printed sheets, to be applied to the document to be printed.

According to an embodiment of the present general inventive concept, the application program unit 160, the color management driver 170, and the printer driver 180 may be stored in a recording medium, such as the hard disk drive (HDD).

The communication control unit 190 is connected to the image forming device 200 through a communication network, and controls a bidirectional communication interface with the image forming device 200. The communication control unit 190 transmits the printer data provided by the printer driver 180 to the image forming device 200 under control of the CPU 150.

The image forming device 200 prints the printer data received from the host device 100 according to the set one or more print options.

Hereinafter, a method of generating a preview image according to an embodiment of the present general inventive concept will be explained in detail with reference to FIGS. 1 to 5.

FIG. 4 is a flowchart illustrating the method of generating the preview image according to an embodiment of the present general inventive concept. The method of FIG. 4 may be performed by the application program unit 160 and/or the color management driver 170 of FIG. 2.

Referring to FIG. 4, the document to be printed is prepared via the application program unit 160 (operation S405). It is then determined whether the color management driver 170 is selected (operations S410). If the color management driver 170 is selected, the preview image of the document to be printed is to be confirmed, before actually printing the document using the image forming device 200. Thus, the color management driver 170 is driven after the document to be printed is prepared via the application program unit 160 (the operations S405 and S410). The color management driver 170 can be selected using a print setting window (not illustrated) provided by the application program unit 160 according to the print command.

If the printer driver 180 (i.e., not the color management driver 170) is selected at the operation S410, the CPU 150 performs a general operation to display a print option setting screen (not illustrated) provided by the printer driver 180 selected so as to set the one or more print options to be applied to the document to be printed (operation S420).

If the color management driver 170 is determined to be selected at the operation S410, the object classifying unit 171 of the color management driver 170 classifies the data input from the application program unit 160 into the text object(s), the image object(s), and the graphic object(s) to output the classified objects (operation S425). The respective objects classified by the object classifying unit 171 are stored in the text buffer 172, the image buffer 173, and the graphic buffer 174, respectively.

The file generating unit 175 generates a file by synthesizing the respective objects stored in the text buffer 172, the image buffer 173 and the graphic buffer 174 (operation S430). The file generated by the file generating unit 175, which is derived from the document to be printed, becomes the file to be printed. Once the file generation is completed, the color matching unit 176 performs the color matching operation to convert a first color signal of the file input from the file generating unit 175 into a second color signal that corresponds to the image forming device 200 (operation S435). The color matching unit 176 may perform the color matching operation using the lookup table that corresponds to the rendering intents set for the different types of objects.

If the color matching operation for the file generated by the file generating unit 175 is completed by the color matching unit 176 (operation S440), the screen generating unit 177 generates and provides the color information setting screen 300 to display the preview image of the color-matched file (operation S445). Accordingly, the color information setting screen 300 as illustrated in FIG. 3 may be displayed on the display device 122.

The user can estimate the color of the document to be printed by the image forming device 200 using the preview image displayed in the preview window 310 of the color information setting screen 300. The user can also correct the color of the preview image using the rendering intent setting window 340 and/or the color information correcting window 350.

First, when changing the rendering intents for the different types of objects (operation S450), the user selects the type of object (i.e., attribute) for which the rendering intent is to be changed using menu item(s) provided in the rendering intent setting window 340, and selects the rendering intent to be applied (i.e., changed) to the selected type of object (operation S452). If the rendering intent of the selected type of object is changed using the rendering intent setting window 340, the color matching unit 176 re-performs the color matching operation based on the changed rendering intent (operation S454). The color matching unit 176 may re-perform the color matching operation only with respect to the selected type of object for which the rendering intent is changed. If the color matching operation is completed, the screen generating unit 177 re-generates the preview image based on the result of the re-performed color matching operation, and displays the re-generated preview image in the preview window 310 (operation S456). Accordingly, the preview image displayed in the preview window 310 of the color information setting screen 300 is updated.

When correcting the color of the preview image displayed in the preview window 310 (operation S460), the user selects the object for which the color is to be corrected. The user then sets a color value to be applied to the selected object (operation S462). The selecting of the object for which the color is to be corrected is described as follows. The user can move a cursor of a mouse to the preview image displayed in the preview window 310 and clicks a right button of the mouse. As a result, the short cut menu 370 is displayed in the preview window 310 of the color information setting screen 300 as illustrated in FIG. 3. The user can select one color of the selected object for which the color is to be corrected or the user can select in the object by selecting a menu item displayed in the short cut menu 370. When selecting an object selection mode from the short cut menu 370, the object for which the color is to be corrected can be selected from among a plurality of objects included in the preview image. It should be understood that other input devices and/or processes can be used to select the object for which the color is to be corrected.

The selecting of a specified color for the selected object is described as follows. The user selects the object for which the color is to be corrected by selecting the object selection mode. The user then selects a color selection mode by selecting the right button of the mouse. Next, the cursor of the mouse is changed to an eyedropper shape. The user can select only the specified color for the selected object using the eyedropper-shaped cursor. It should be understood that other input devices and/or processes can be used to select the color (i.e., the specified color) for the selected object.

Figure 5B:
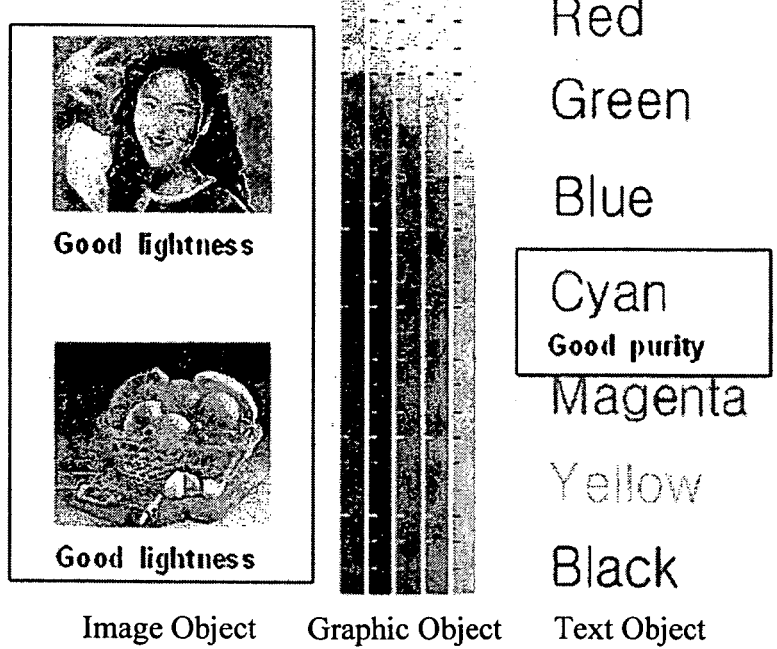

If a color value of the specified color to be applied to the selected object for which the color is to be corrected is set at the operation S462, the color correcting unit 178 corrects the color of the selected object to the set color value, which corresponds to the specified color (operation S464). The color value to be applied to the selected object can be set using a slide bar to adjust the lightness and/or a slide bar to adjust the saturation provided in the color information correcting window 350. The screen generating unit 177 re-generates the preview image based on the result of color correction at the operation S464, and displays the re-generated preview image in the preview window 310 (operation S466). FIG. 5A illustrates an example of the preview image before the color correction operation is performed, and FIG. 5B illustrates an example of the preview image after the color correction operation is performed.

If the color correction operation of the preview image displayed in the preview window 310 is completed (operation S470), the color management driver 170 transmits to the printer driver 180 the file to be printed for which the color correction operation is completed. The printer driver 180 converts the file and color correction information provided by the color management driver 170 into the printer data that is recognizable by the image forming device 200 (operation S475). The printer data converted by the printer driver 180 is then transmitted to the image forming device 200 through the communication control unit 190 (operation S480).

In the present embodiment, the color management driver 170 may be separately provided, but the present general inventive concept is not limited thereto. That is, the functions provided by the color management driver 170 may be added to the printer driver 180. In this case, the method(s) described above can be performed using the printer driver 180.

The present general inventive concept may be embodied in a computer by running a program from a computer-readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present general inventive concept may be embodied as a computer-readable medium having a computer-readable program code to cause a number of computer systems connected via a network to effect distributed processing.

According to the various embodiments of the present general inventive concept described above, a preview image is generated based on data that is color-matched for different objects contained in a document to be printed. Thus, the preview image appears to be substantially the same image as that of the document printed through the image forming device.

Additionally, color of the preview image desired by a user can be corrected on a preview screen, and a result of the color correction can be confirmed in real time using the preview screen.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of previewing an image usable with an image forming apparatus, the method comprising:
   setting a plurality of rendering intents associated with a plurality of different data object types; and
   generating a user interface including a preview image of a specified file according to the set plurality of rendering intents and a rendering intent setting window through which one or more rendering intents are changeable for the plurality of different data object types, such that characteristics of the one or more rendering intents selected to be associated with the respective data types may be adjusted, and a color correcting window to receive an input of a color value to be applied to the selected area;
   after generating the user interface including the preview image, receiving a user input to select one of the respective data types, receiving a user selection corresponding to an area in the preview image where color is to be corrected, receiving a user input corresponding to a color value to be applied the selected area, adjusting a rendering intent associated with the one of the respective data types, and correcting the color of the selected area based on the input color value; and
   updating the preview image to adjust the rendering intent of each object of a respective data object type in the preview image according to the user input and by performing a color matching operation according to the adjusted rendering intent of each object, and updating the preview image with the corrected color of the selected area.

2. The method as claimed in claim 1, further comprising:
   enabling the specified file to be prepared using one or more applications to include the plurality of different data object types including at least one of an image object, a text object, and a graphic object.

3. The method as claimed in claim 1, wherein the plurality of different data object types comprise first, second, and third data object types, and the setting of the plurality of rendering intents comprises:
   classifying objects contained in the specified file according to the different data object types;
   performing a first storing operation to store one or more objects of the first data object type, performing a second storing operation to store one or more objects of the second data object type, and performing a third storing operation to store one or more objects of the third data object type; and
   synthesizing the stored objects of the first, second, and third data object types in a predetermined file format.

4. The method as claimed in claim 3, wherein the setting of the plurality of rendering intents further comprises:
   performing a color matching operation by converting a first color signal of the specified file in the predetermined file format to a second color signal to be printed in the image forming apparatus according to the set plurality of rendering intents.

5. The method as claimed in claim 4, wherein the color matching operation is performed using a first International Color Consortium (ICC) profile associated with a display unit on which the preview image is viewable and a second ICC profile associated with the image forming apparatus.

6. The method as claimed in claim 4, wherein the setting of the plurality of rendering intents further comprises:
generating a preview window to display the preview image corresponding to the second color signal of the specified file.

7. The method as claimed in claim 6, wherein the preview window enables the set plurality of rendering intents associated with the plurality of different data object types to be changed after the preview image is displayed such that the color matching operation is re-performed according to the changed plurality of rendering intents when the plurality of rendering intents associated with the plurality of different data object types are changed.

8. The method as claimed in claim 6, wherein the setting of the plurality of rendering intents further comprises:
enabling a color of the displayed preview image to be changed using at least one of a color correcting window to correct one or more color characteristics and a rendering intent setting window to change the set plurality of rendering intents associated with the plurality of different data object types.

9. The method as claimed in claim 6, wherein the setting of the plurality of rendering intents further comprises:
enabling a color of each data object type of the displayed preview image to be changed separately using a color correcting window to correct one or more color characteristics by selecting an object in the displayed preview image and selecting a new color value for the selected object such that the preview image is re-generated accordingly.

10. The method as claimed in claim 9, wherein the enabling of the color of each data object type of the displayed preview image to be changed using a color correcting window comprises:
operating in an object selection mode to enable a user to select the object for which the color is to be changed; and
operating in a color selection mode to enable the user to select the new color value for the selected object.

11. The method as claimed in claim 9, wherein the color correcting window includes one or more slide bars to change at least one of a color saturation and a color brightness of the selected object.

12. The method as claimed in claim 1, further comprising:
generating file information and associated color information of the specified file;
converting the file information and the associated color information into printer data that is readable by the image forming apparatus; and
sending printer data to the image forming apparatus.

13. The method as claimed in claim 1, wherein the receiving a user input further comprise:
generating a short cut menu to select one color of the object subject to color correction when the preview window is selected.

14. The method as claimed in claim 13, wherein the short cut menu is displayed on the preview window.

* * * * *